C. H. WETZEL.
PORTABLE GRAND STAND.
APPLICATION FILED JULY 10, 1919.
1,318,192.
Patented Oct. 7, 1919.
4 SHEETS—SHEET 1.
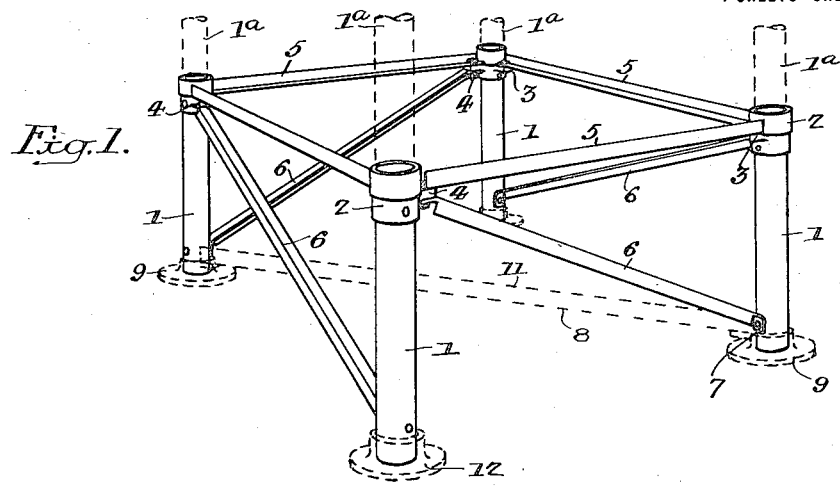
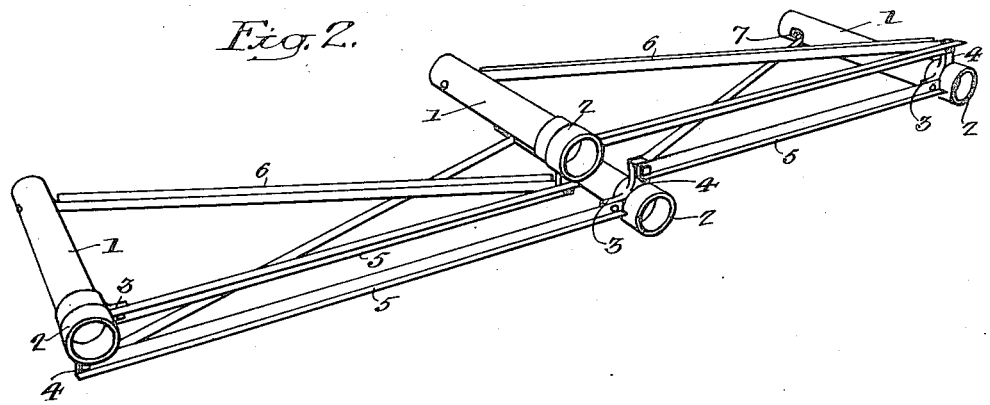
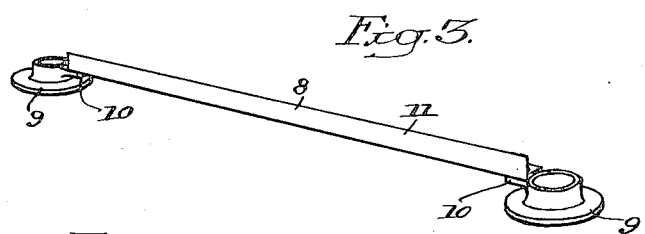
Inventor:
Charles H. Wetzel,
by his Attorneys,
Howson & Howson.

C. H. WETZEL.
PORTABLE GRAND STAND.
APPLICATION FILED JULY 10, 1919.

1,318,192.

Patented Oct. 7, 1919.
4 SHEETS—SHEET 2.

Inventor:
Charles H. Wetzel
by his Attorneys.
Howson & Howson

C. H. WETZEL.
PORTABLE GRAND STAND.
APPLICATION FILED JULY 10, 1919.

1,318,192.

Patented Oct. 7, 1919.
4 SHEETS—SHEET 3.

Inventor:
Charles H. Wetzel
By his Attorneys,
Howson & Howson.

C. H. WETZEL.
PORTABLE GRAND STAND.
APPLICATION FILED JULY 10, 1919.

1,318,192.

Patented Oct. 7, 1919.
4 SHEETS—SHEET 4.

Inventor,
Charles H. Wetzel
by his Attorneys,
Howson & Howson

UNITED STATES PATENT OFFICE.

CHARLES H. WETZEL, OF WAYNE, PENNSYLVANIA.

PORTABLE GRAND STAND.

1,318,192.     Specification of Letters Patent.     Patented Oct. 7, 1919.

Application filed July 10, 1919. Serial No. 309,861.

*To all whom it may concern:*

Be it known that I, CHARLES H. WETZEL, a citizen of the United States, residing in Wayne, Pennsylvania, have invented a Portable Grand Stand, of which the following is a specification.

This invention relates to portable grandstands, the object of my invention being to provide a grandstand comprising unit sections, each section capable of being folded, and dimensioned so as to make handling thereof easy and to facilitate their transportation and storage.

In the attached drawings:

Figure 1 is a view in perspective of one of the single sections or units;

Fig. 2 is a perspective of the single section shown in Fig. 1 in folded condition;

Fig. 3 is a perspective of one of the diagonal cross-braces (also shown in broken lines in Fig. 1) which keep the sections from collapsing when installed in the assembled structure.

Fig. 4 is a perspective of one of the flanges which are attached to the feet of the section uprights used at corners other than those connected by the diagonal cross-braces;

Figure 5:
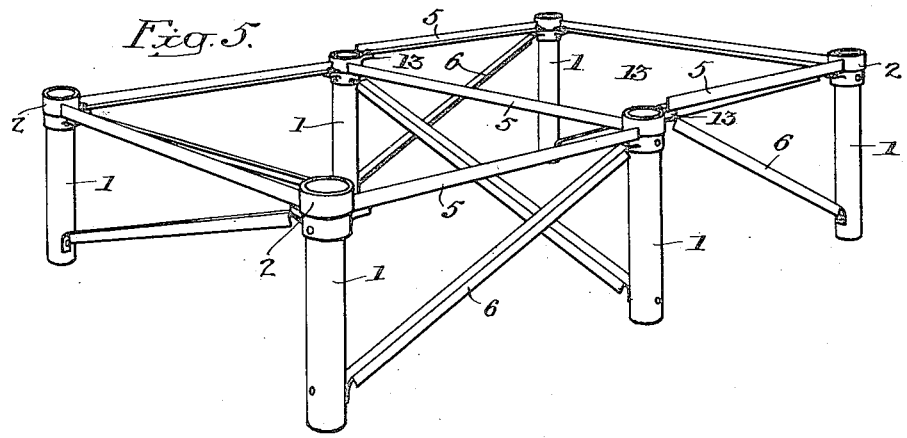
Fig. 5 is a perspective of one of the double or bridge sections.

With reference to the drawings the single unit section illustrated in Fig. 1, comprises four uprights or posts, 1, each post having attached to the upper end thereof in any suitable manner, a hollow member, 2, so shaped and proportioned as to form sockets for the reception of the bases of the uprights of a superimposed section, these uprights being shown in broken lines and indicated by reference numbers $1^a$. Each of the socket members, 2, carries two laterally extending lugs, 3 and 4, disposed at right angles to each other, to which are attached the cross-braces which form connection between the uprights, 1, the connecting cross-braces, 5, and diagonal braces, 6, one of each extending between each pair of adjacent uprights, as clearly indicated in the drawings. The extremities of the horizontal braces, 5, are attached at the upper faces of the lugs 3 and 4 upon adjacent uprights; while the upper extremity of the diagonal braces is attached in each case at the underside of the lug 4, and the lower extremity, to the adjacent post itself, at a point indicated in the drawings by the reference numeral 7. In order to secure the folding feature of the units, I have attached the upper end of each diagonal brace and the corresponding ends of the horizontal braces to the lugs 4 in pivotal manner, in the present case by means of a bolt or pin extending through apertures in said brace extremities and through the lugs, while the lower extremities of the diagonals and the corresponding ends of the horizontal braces may be solidly attached in any manner desired, as by welding or riveting, to the uprights, 1, and the lugs, 3, respectively. By this means the section or unit is capable of being folded as illustrated in Fig. 2, and when thus folded may be easily transferred from place to place and stored in a comparatively limited space. In order to eliminate the possibility of any movement of the sections when in use and to render the structure quite rigid, a securing brace, 8, is provided, extending diagonally between the feet of two diagonally opposite uprights of each base section, as shown in broken lines in Fig. 1, the brace comprising two flanges, 9, adapted to fit upon the lower extremities of the uprights, each flange having a laterally extending lug, 10, to which lugs are secured cross-bar, 11. Single base flanges, 12, illustrated in Fig. 4, are provided for the lower extremities of each of the other uprights of the base or floor sections.

Figure 6:
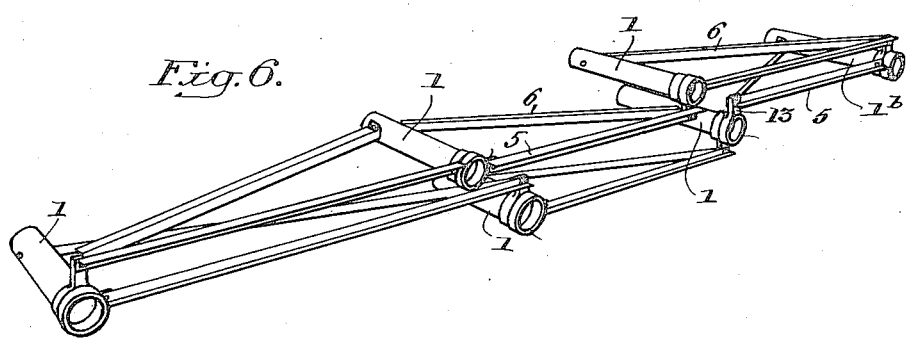
Fig. 6 is a perspective of the double or bridge section of Fig. 6 in folded condition.
Figure 7:
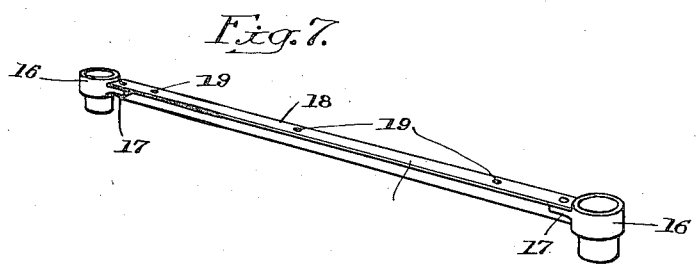
Fig. 7 is a perspective of one of the upper cross-braces, or plank supports.
Figure 8:
Fig. 8 is a perspective of one of the upper sockets used at corners other than those connected by the upper cross-braces.
Figure 9:
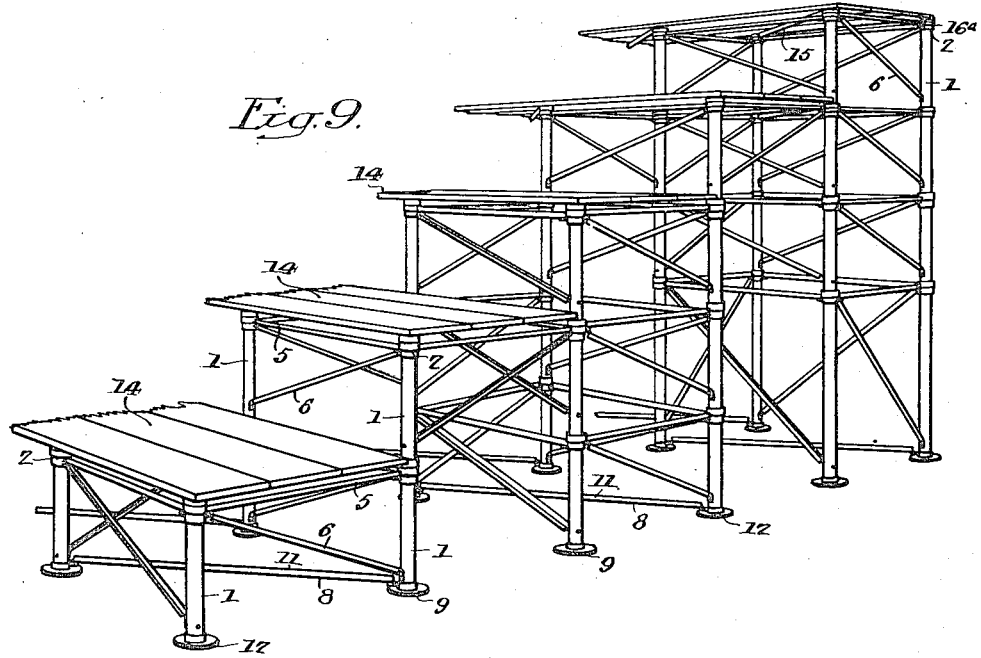
Fig. 9 is a perspective of a portion of the assembled grandstand illustrating the disposition of the single units and double or bridge sections.

In Fig. 5 is illustrated a double or bridge section which comprises a single section such as that just described with the addition of two extra posts or uprights, which are connected with each other and with the two adjacent uprights, of the single section in the usual manner by means of diagonals, 6, and horizontal braces, 5, similar in all respects to the diagonal and horizontal braces connecting the uprights of the single section previously described. It is necessary, however, to provide extra lugs, 13, upon the two middle posts of the bridge sections for establishing a connection between these and the extra pair of uprights. These lugs, 13, are provided upon the socket members, 2, attached to the upper end of each of the central uprights, each of the two said socket members carrying three lugs, as clearly shown in the drawings, instead of the normal two lugs upon the other or corner uprights. The diagonals and cross-braces which connect the uprights of the bridge sections are attached to said uprights in manner similar to those of the single section illustrated in Fig. 1, the connection at the elevated end of each diagonal and the corresponding end of each cross-brace being pivotal in nature and the connection at the opposite ends of the braces being rigid. By this means the double section is foldable in manner similar to the single section, as illustrated in Fig. 6, which shows the double section of Fig. 5 in the folded state. A general conception of the assembled grandstand may be had from Fig. 9 which shows the stepped formation of the structure and the disposition thereon of the planks or boards, 14, which form the seats. In order that there may be a level foundation for the said boards, plank supporting cross pieces, 15, are provided, these cross pieces comprising the two members, 16, adapted to seat within the socket members 2, and having laterally extending lugs, 17, to which are attached the extremities of a cross bar, 18. The plank supports are disposed diagonally across the top of each of the sections in such manner as to form a foundation for said planks as already described. Independent members, 16ª, similar in all respects to the members, 16, with the exception that they carry no lugs, are provided to place within the socket members, 2, of each plank supporting section which are not occupied by the members, 16, thereby making the uprights all of the same height. It will be noticed that the top surface of the cross bar, 18, is placed substantially level with the top surfaces of the members, 16, and that the said bars are apertured at 19 for the reception of spikes or pins extending down from the under side of the planks, thereby providing against any sliding movement of the planks upon the structure.

There are, of course, no specified materials of which the sections and attachments are to be made, but I preferably form the uprights of wrought iron piping, the various flanges, sockets and other attachments being of malleable iron, while the cross-braces I have shown are composed of sections of angle iron. As previously stated, the various elements are attached together by any suitable means, such as bolts, rivets or welding. With the exception of the securing brace, 8, and the base flanges, 12, the plank supporting braces, 15, and the members, 16ª, all of which are detachable and only temporarily established in the assembled structure, the sections are unified structures and form real structural units.

Figure 10:
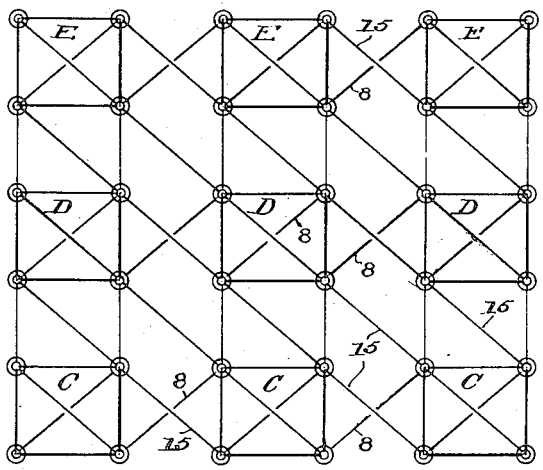
Fig. 10 is a diagrammatic view illustrating the disposition of the various units.
Figure 11:
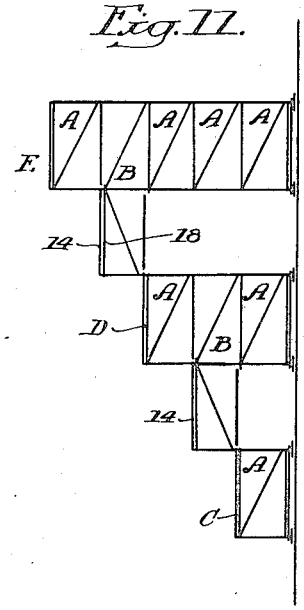
Fig. 11 is a view illustrating in diagram a side elevation of the grandstand, also illustrating the disposition of elements and also illustrating the manner of assembling.

The disposition of the units in the assembled stand is best illustrated in the diagrams of Figs. 10 and 11 in which the letters A represent single sections, and the letters B represent the double or bridge sections. The general plan of construction is to assemble the sections or units into a series of adjacent towers, C, D, and E progressively and uniformly increasing in height, each tower being connected to the next shorter tower by means of one of the double sections which bridges the gap, as clearly illustrated in Figs. 9 and 11. Thus the lowest tower C consists of one single section, the next higher tower D consists of two single sections with a double section interposed between them and extending over to the tower C, while the tower E comprises four single sections and a double section which extends over to the top of tower D. The whole stand may be raised bodily in order to increase the height of the first tower C by placing additional sections A under each tower. There may, of course, be other towers of still greater height and the capacity of the stand increased as desired. In extending the grandstand laterally, further series of adjacent and connected towers, C, D and E, are placed side by side and connected by means of securing braces, 8, extending between the feet of the uprights of the adjacent series and plank supporting bases, 15, extending between the tops of the uprights of the adjacent series as clearly indicated in Fig. 10.

Figure 12:
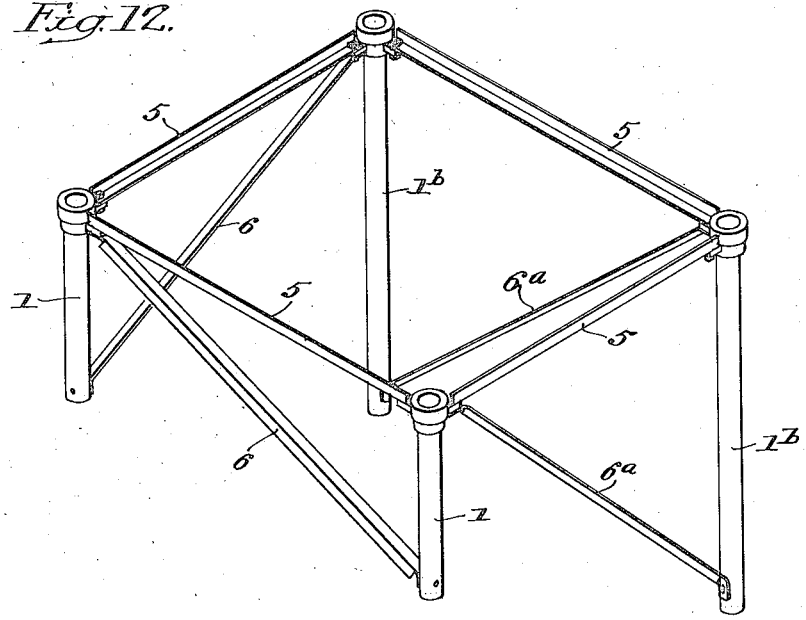
Fig. 12 is a view in perspective of a modified form of unit section.
Figure 13:
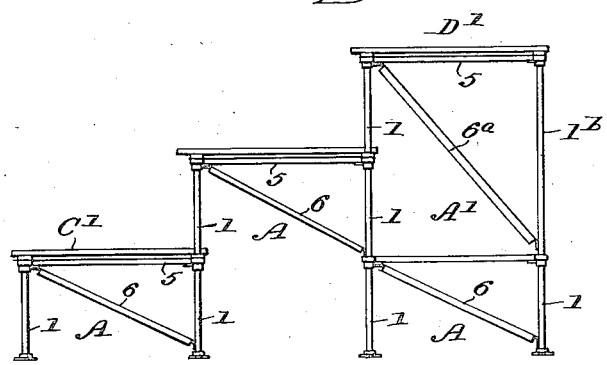
Fig. 13 is a side elevation of an assembled grandstand illustrating the disposition of the various units when the modification shown in Fig. 12 is employed.

In Figs. 12 and 13 I have illustrated a modification of the unit folding section. This section is in every respect similar to the section already described and illustrated in Fig. 1 with the exception that two of the uprights, 1ᵇ, 1ᵇ, are made twice the length of the uprights, 1, 1, of the same and of the other sections which constitute the grandstand, this, of course, necessitating the use in the section of two diagonal braces, 6ª, 6ª, of greater length than ordinary diagonal braces 6, 6. The disposition of this section in the assembled grandstand is illustrated in Fig. 13, the arrangement being similar to the tower construction already described. The front and lowest tower, C¹, consists, in the present case, of a single section A, while the second tower comprises a single section A at the bottom and the extended section A¹, illustrated in Fig. 12 superposed on said single section, the short legs 1, of said section A¹ being supported on the top of a single section A, which is supported in turn upon the uprights of the two base sections of the towers and which bridges the gap therebetween. The double or bridge section of Fig. 6 is thus eliminated and a saving in material accomplished. By means of the construction herein described, a stand of practically any desired capacity may be erected, the stand being uniformly stepped from the base to the top, and thoroughly braced and unified and capable of withstanding any strain normally met with. A grandstand structure made in accordance with my invention may be erected by one or two men without the use of tools and with a minimum amount of labor, and can be taken down, folded up and stored away by one man if desired.

I claim—

1. A grandstand structure composed of a series of independent units adapted to be superposed one upon another, each unit forming a complete foldable structure when separated from the others.

2. A grandstand structure composed of a number of independent units, each unit comprising a series of uprights and cross-braces so connected as to constitute a structure foldable upon itself when not in use.

3. A grandstand structure composed of a number of independent units, each unit comprising a series of uprights, and cross-braces connecting said uprights, said braces being pivotally attached at one end to one of said uprights and rigidly attached at the other end to another of said uprights.

4. A grandstand structure composed of a number of independent units, each unit comprising a series of uprights, and cross-braces connecting said uprights, the junctions between said cross-braces and uprights at one end of said braces being pivotal to permit the folding of said units.

5. A grandstand structure composed of a number of independent units, each unit comprising a series of uprights, means for securing the lower extremities of the uprights of one of said units to the upper extremities of the uprights of another of said units, and cross braces connecting said uprights, said braces being so secured to said uprights as to permit folding of said units.

6. A grandstand structure composed of a number of independent units, each unit comprising a series of uprights with cross-braces connecting said uprights, said braces being pivotally attached at one end to said uprights to permit folding said units, and socket members upon the uprights of said units for receiving the extremities of the uprights of another of said units.

7. A grandstand structure composed of a number of independent units, each unit comprising a series of uprights having socket members upon the upper end thereof for the reception of the lower extremities of the uprights of a superposed unit, and cross-braces connecting said uprights, said braces being hinged at one end of said uprights and rigidly secured at the other end to another of said uprights.

8. A grandstand structure composed of a number of independent units, each unit comprising a series of posts connected by horizontal and by diagonal cross-braces, each of said braces being hinged at one end to said posts and being rigidly secured at the other end to another of said posts.

9. A grandstand structure composed of a number of independent units, each unit comprising a series of posts having upon the upper ends thereof a socket member for the reception of the lower extremities of the posts of a superposed unit, lugs carried by said socket members, a horizontal and diagonal cross-brace extending between each adjacent pair of posts, one end of the horizontal cross-brace and the elevated end of the diagonal brace being pivotally attached to one of said lugs upon the socket member of one post and the opposite ends of said horizontal and diagonal braces being rigidly attached to a lug upon the socket member of another post and to the lower end of the post respectively.

10. A grandstand structure composed of a number of independent units, each unit comprising a series of uprights and cross-braces connected to constitute a structure foldable upon itself when not in use, and means for preventing folding of said unit when in use.

11. A grandstand structure composed of a number of independent units, each unit comprising a series of uprights and cross-braces connected to constitute a structure foldable upon itself when not in use and a securing brace extending between two of the uprights for preventing folding of said unit when in use.

12. A grandstand structure composed of a number of independent units, each unit comprising a series of uprights and cross-braces so connected as to constitute a structure foldable upon itself when not in use, and means for supporting seat members upon the top of said units.

13. A grandstand structure composed of a number of independent units, each unit comprising a series of uprights and cross-braces connected to constitute a structure foldable upon itself when not in use, and plank supporting braces extending between the upper ends of two of said uprights and detachably secured thereto.

14. A grandstand structure composed of a number of independent units, each unit comprising a series of uprights and cross-braces connected to constitute a structure foldable upon itself when not in use, and plank supporting braces extending between the upper ends of two of said uprights and detachably secured thereto, said supporting braces being apertured for the reception of pins upon said planks for preventing slipping thereof.

15. A grandstand structure comprising a number of independent units superposed one upon another to form tower structures of differing heights, said towers being spaced apart, and units establishing connection between said tower structures and bridging the space therebetween.

16. A grandstand structure comprising a number of independent units superposed one upon another to form a series of tower structures of different heights, said towers being spaced apart, and an extension carried by certain of the units constituting said tower structures whereby the spaces between adjacent tower structures are bridged.

17. A grandstand structure comprising a number of independent units superposed one upon another to form a series of tower structures of uniformly differing heights, said towers being spaced apart and disposed one behind another in regular order according to height, and an extension carried by one of the units constituting each of the tower structures with the exception of one thereof, said extension bridging the space and establishing connection between each of said tower structures and the tower structure immediately in front thereof.

18. A grandstand structure comprising a number of independent units superposed one upon another to form a plurality of series of tower structures of uniformly differing heights, said towers of each series being spaced apart and disposed one behind another in regular order according to height and all but one tower of each series comprising a unit having an extension whereby the spaces between said towers of a series are bridged and connection between said towers established, said plurality of series being placed side by side and united by braces extending therebetween, the whole forming a structure ascending from front to rear in a series of steps, and planks placed upon said steps to form the seats of the said grandstand.

CHARLES H. WETZEL.